(12) United States Patent
Dircks

(10) Patent No.: US 11,476,736 B2
(45) Date of Patent: Oct. 18, 2022

(54) ELECTRIC MOTOR

(71) Applicant: Eagle Industry Co., Ltd., Tokyo (JP)

(72) Inventor: Ron Dircks, Kerkrade Parkstad (NL)

(73) Assignee: EAGLE INDUSTRY CO., LTD.

( * ) Notice: Subject to any disclaimer, the term of this patent is extended or adjusted under 35 U.S.C. 154(b) by 194 days.

(21) Appl. No.: 16/770,546

(22) PCT Filed: Dec. 13, 2018

(86) PCT No.: PCT/JP2018/045796
§ 371 (c)(1),
(2) Date: Jun. 5, 2020

(87) PCT Pub. No.: WO2019/117229
PCT Pub. Date: Jun. 20, 2019

(65) Prior Publication Data
US 2020/0373814 A1    Nov. 26, 2020

(30) Foreign Application Priority Data
Dec. 15, 2017 (JP) .............................. JP2017-241026

(51) Int. Cl.
*H02K 9/19* (2006.01)
*H02K 5/20* (2006.01)
(Continued)

(52) U.S. Cl.
CPC ................. *H02K 9/19* (2013.01); *H02K 1/20* (2013.01); *H02K 1/32* (2013.01); *H02K 5/20* (2013.01)

(58) Field of Classification Search
CPC ............ H02K 9/19; H02K 9/197; H02K 1/20; H02K 1/32; H02K 5/20; H02K 5/203
(Continued)

(56) References Cited

U.S. PATENT DOCUMENTS 3,060,335 A * 10/1962 Greenwald .............. H02K 9/19
310/58
7,489,057 B2    2/2009 Zhou et al. ..................... 310/61
(Continued)

FOREIGN PATENT DOCUMENTS

CN      104753296 A  *  7/2015
CN      107093933       8/2017    ............... H02K 3/46
(Continued)

OTHER PUBLICATIONS

Extended European Search Report issued in EP Patent Appln. 18887523.1, dated Jul. 30, 2021, 9 pages.
(Continued)

*Primary Examiner* — Michael Andrews
(74) *Attorney, Agent, or Firm* — Hayes Soloway P.C.

(57) ABSTRACT

An electric motor includes a rotation shaft formed in a hollow shape, a rotor attached to the rotation shaft, a stator provided on an outer periphery side of the rotor, and a case having the rotor and the stator housed therein. The electric motor 1 is capable of cooling by a cooling-fluid flowing in a cooling-fluid flow passage which includes an inner flow passage formed inside the rotation shaft, an outer flow passage formed between an outer periphery of the stator and an inner periphery of the case, and a first communication flow passage isolated from a housing space of the case in which the rotor is housed. The first communication flow passage provides communication between the inner flow passage and the outer flow passage.

20 Claims, 6 Drawing Sheets

(51) Int. Cl.
*H02K 1/20* (2006.01)
*H02K 1/32* (2006.01)

(58) Field of Classification Search
USPC ............................................. 310/54, 58, 59
See application file for complete search history.

(56) References Cited

U.S. PATENT DOCUMENTS

| | | | |
|---|---|---|---|
| 2002/0047343 A1 | 4/2002 | Kawamura et al. | 310/60 |
| 2010/0264759 A1 | 10/2010 | Shafer et al. | 310/54 |
| 2012/0235521 A1 | 9/2012 | Cai et al. | |
| 2016/0164377 A1 * | 6/2016 | Gauthier | H02K 1/32 |
| | | | 310/54 |
| 2016/0164378 A1 | 6/2016 | Gauthier et al. | H02K 3/24 |
| 2016/0226327 A1 | 8/2016 | Rippel et al. | H02K 3/24 |
| 2017/0237306 A1 * | 8/2017 | Juris | H02K 3/522 |
| | | | 310/52 |

FOREIGN PATENT DOCUMENTS

| | | | | |
|---|---|---|---|---|
| DE | 102011078791 A1 * | 1/2013 | | H02K 1/32 |
| DE | 102013226851 A1 * | 6/2015 | | H02K 5/161 |
| DE | 10 2014 117 382 | 6/2016 | | H02K 9/19 |
| DE | 102014117382 A1 * | 6/2016 | | |
| FR | 2 038 911 | 1/1971 | | H02K 9/00 |
| JP | S4883304 | 10/1973 | | H02K 5/20 |
| JP | 9-163682 | 6/1997 | | H02K 9/197 |
| JP | 2000-341908 | 12/2000 | | H02K 4/08 |
| JP | 2002-95217 | 3/2002 | | H02K 9/06 |
| JP | 2004-159402 | 6/2004 | | H02K 9/19 |
| JP | 2004159402 A * | 6/2004 | | |
| JP | 2008-219960 | 9/2008 | | H02K 9/19 |
| JP | 2010-28958 | 2/2010 | | H02K 9/19 |
| JP | 2012-524514 | 2/2010 | | H02K 9/19 |
| JP | 2014-108009 | 10/2012 | | H02K 5/20 |
| JP | 2014108009 A * | 6/2014 | | |
| JP | 2017-131078 | 7/2017 | | H02K 9/19 |
| JP | 2017-212860 | 11/2017 | | H02K 9/19 |
| KR | 2014073005 A * | 6/2014 | | |
| WO | WO-2015120914 A1 * | 8/2015 | | H02K 1/18 |
| WO | WO 2016/123507 | 8/2016 | | H02K 9/19 |

OTHER PUBLICATIONS

Chinese Official Action issued in Chinese Patent Appln.201880080229.7, dated Dec. 3, 2021, 14 pages.

International Search Report and Written Opinion issued in PCT/JP2018/045796, dated Feb. 5, 2019, with English translation, 19 pages.

International Preliminary Report on Patentability issued in PCT/JP2018/045796, dated Jun. 25, 2020, 10 pages.

Chinese Official Action issued in Chinese Patent Appln.201880080229.7, dated Jun. 10, 2022, 13 pages.

* cited by examiner

ELECTRIC MOTOR

TECHNICAL FIELD

The present invention relates to an electric motor capable of cooling by a cooling-fluid flowing through a cooling-fluid flow passage formed inside the electric motor.

BACKGROUND ART

The electric motor includes a rotation shaft, a rotor attached to the rotation shaft, a stator provided on the outer periphery of the rotor, and a case having the rotor and the stator housed therein. At least any one of the rotor and the stator is an electromagnet formed by winding a coil. By the magnetic force generated by the energized coil, the rotation shaft is rotated together with the rotor.

Upon the driving of the electric motor, the electric motor has heat including heat generated by electric power distribution to the coil, heat generated in a sliding contact portion between the rotation shaft and a bearing, etc. Therefore, there are proposed several techniques of cooling an electric motor in order to prevent a decline in efficiency or failure of the electric motor due to the heat generation.

For example, in an electric motor shown in Patent Citation 1, the interior of a rotation shaft is hollow, and a pipe having a smaller diameter than an inner diameter of the rotation shaft is disposed in this hollow space. A cooling-fluid is fed into the pipe from a cooling-fluid tank installed in the exterior of the electric motor by a pump. The cooling-fluid passes through the interior of the pipe, flows into a flow passage formed between the rotation shaft and the pipe from a leading end of the pipe, and then is returned to the cooling-fluid tank through the flow passage.

In an electric motor shown in Patent Citation 2, the interior of a rotation shaft is hollow, a pipe is inserted through this hollow space, and a cooling-fluid is fed into the pipe from a cooling-fluid tank installed in the exterior of the electric motor by a pump. In both longitudinal end portions of the rotation shaft, through holes communicating with the hollow space and an inner space of a case in which a rotor and a stator are housed are formed. A discharge passage connected to the cooling-fluid tank is provided in the case. After flowing into the pipe and flowing into the inner space of the case through the through holes, the cooling-fluid is returned to the cooling-fluid tank through the discharge passage.

In an electric motor shown in Patent Citation 3, the interior of a rotation shaft is hollow, and a pipe having a smaller diameter than an inner diameter of the rotation shaft is disposed in the hollow space. A cooling-fluid is fed into the pipe from a cooling-fluid tank installed in the exterior of the electric motor by a pump. The cooling-fluid passes through the interior of the pipe, flows into a flow passage formed between the rotation shaft and the pipe from an end of the pipe, and then is returned to the cooling-fluid tank through the flow passage.

A cooling jacket is attached to a case so as to surround the outer periphery of the case in the circumferential direction, the case having a rotor and a stator stored therein. A flow passage space is formed between an outer peripheral surface of the case and the cooling jacket, so that the cooling-fluid is fed into the flow passage space from the cooling-fluid tank by the pump. A discharge passage connected to the cooling-fluid tank is provided in the cooling jacket. After flowing into the flow passage space, the cooling-fluid is returned to the cooling-fluid tank through the discharge passage.

CITATION LIST

Patent Literature

Patent Citation 1: U.S. Pat. No. 7,489,057
Patent Citation 2: US 2016/0164378 A1
Patent Citation 3: JP 2012-524514 T (Page 5, FIG. 3)

SUMMARY OF INVENTION

Technical Problem

In the electric motor of Patent Citation 1, by feeding the cooling-fluid into the flow passage formed between the rotation shaft and the pipe, the sliding contact portion between the rotation shaft and the bearing is cooled, and the rotor is also cooled via the rotation shaft. However, only the rotation shaft and a peripheral portion of the rotation shaft are cooled. Thus, an effect of cooling the stator cannot be expected.

In the electric motor of Patent Citation 2, a peripheral portion of the rotation shaft is cooled by a fluid flowing into the hollow space of the rotation shaft, and the rotor and the stator are cooled by the cooling-fluid flowing into the interior of the case. However, the cooling-fluid flowing into the interior of the case is brought into direct contact with the rotor and the stator. Thus, the cooling-fluid is agitated by the rotor, so that the cooling-fluid serves as resistance against rotation of the rotor.

In the electric motor of Patent Citation 3, the interior of the rotation shaft is hollow, the rotation shaft and a peripheral portion of the rotation shaft are cooled by a fluid flowing into the hollow space of the rotation shaft. The stator is cooled by a fluid flowing into the flow passage space between the outer peripheral surface of the case and the cooling jacket. However, the flow passage of the cooling-fluid on the rotor side circulated through the hollow space of the rotation shaft and the cooling-fluid tank, and the flow passage of the cooling-fluid on the stator side circulated through the flow passage space between the outer peripheral surface of the case and the cooling jacket and the cooling-fluid tank, are separately provided. Thus, there is a problem that a cooling-fluid flow passage is complicated.

The present invention is achieved focusing on such problems, and an object of the present invention is to provide an electric motor capable of cooling a rotor, a stator and a peripheral portion of a rotation shaft without providing resistance against rotation of the rotor while forming a cooling-fluid flow passage in a simplified manner.

Solution to Problem

In order to solve the above problems, an electric motor according to the present invention might be an electric motor (1) including a rotation shaft (2) formed in a hollow shape, a rotor (3) attached to the rotation shaft (2), a stator (4) provided on an outer periphery side of the rotor (3), and a case (5) having the rotor (3) and the stator (4) housed therein, the electric motor being capable of cooling itself by a cooling-fluid flowing through a cooling-fluid flow passage, wherein the cooling-fluid flow passage includes an inner flow passage (2a) formed inside the rotation shaft (2), an outer flow passage (S2) formed between an outer periphery of the stator (4) and an inner periphery of the case (5), and a first communication flow passage (S1) isolated from a housing space (R) of the case (5) in which the rotor (3) is housed, the first communication flow passage providing communication between the inner flow passage (2a) and the outer flow passage (S2). According to the aforesaid configuration, the rotor and a peripheral portion of the rotation shaft are cooled by the cooling-fluid passing through the inner flow passage which is formed inside the rotation shaft, the stator is cooled by the cooling-fluid flowing through the outer flow passage which is formed between the outer periphery of the stator and the inner periphery of the case, and further, the communication between these flow passages is provided by the first communication flow passage isolated from the housing space of the case in which the rotor is housed. Thereby, the cooling-fluid flow passage can be formed in a simplified manner, and the cooling-fluid does not influence rotation of the rotor.

The rotation shaft (2) might pass through a first support wall portion (5c) placed on a first end side of the rotor (3), and might be axially supported by the first support wall portion (5c). According to this configuration, the housing space for the rotor can be isolated by the first support wall portion axially supporting the rotation shaft. Thus, the communication flow passage can be formed in an easy manner.

The communication flow passage (S1) might be formed by the first support wall portion (5c), and a first cap (17) placed on the first end side and attached to the first support wall portion (5c). According to this configuration, only by attaching the first cap on the first end side to the first support wall portion on the first end side, the first communication flow passage can be formed.

A first seal member (28) might be provided between the stator (4) and the first support wall portion (5c) on the first end side. According to this configuration, the cooling-fluid, contamination, etc. cannot easily come into the housing space of the case between the rotor and the stator.

A first plural through holes (33) serving as part of the first communication flow passage (S1) and passing through the first support wall (5c) in the axial direction might be formed in the first support wall (5c) so as to be arranged in the circumferential direction of the first support wall portion (5c). According to this configuration, a sealing structure of the housing space for the rotor can be formed in an uncomplicated manner, and the number of members serving as the first communication flow passage can be reduced. Since the plural through holes are arranged in the circumferential direction, the outer periphery of the stator can be cooled over a wide range.

The rotation shaft (2) might pass through a second support wall portion (5b) placed on a second end side of the rotor (3), and is axially supported by the second support wall portion (5b), and a second seal member (27) is provided between the stator (4) and the second support wall portion (5b). According to this configuration, the housing space of the case is isolated by the second support wall portion axially supporting the rotation shaft. Thus, the housing space for the rotor can be formed in an easy manner.

A second communication flow passage (S3) is provided on the second end side of the rotor and formed in the second support wall and a second cap attached to the second support wall, the second communication passage communicating with the outer flow passage (S2) and being open toward an exterior of the electric motor. According to this configuration, on the second end side of the rotor, the cooling-fluid flow passage can be easily formed.

Second plural through holes (32) might be formed in the second support wall so as to pass through the second support wall in the axial direction and communicates with the outer flow passage (S2). According to this configuration, the sealing structure of the housing space for the rotor can be formed in an uncomplicated manner.

The inner flow passage (2a) might be open at both axial ends of the rotation shaft (2). According to this configuration, the rotation shaft can have an uncomplicated structure, and a pressure loss between the inner flow passage and the first or second communication flow passage can be reduced.

The cooling-fluid might flow through the inner flow passage (2a), the communication flow passage (S1), and the outer flow passage (S2) in order of description. According to this configuration, since the rotor can be cooled by the low-temperature cooling-fluid, the entire cooling efficiency is excellent.

A recessed portion (44a) recessed toward an inner diameter side might be formed on the outer periphery of the stator (44). According to this aspect, since the cooling-fluid comes into the inner diameter side of the stator due to the recessed portion, the stator can be promptly cooled.

A projected portion (45e) loosely fitted into the recessed portion (44a) of the stator might be formed on the inner periphery of the case (45). According to this configuration, a cross-sectional area of the flow passage becomes substantially constant in a flow direction due to the recessed portion and the projected portion. Thus, the cooling-fluid easily flows to the inner diameter side of the stator.

DESCRIPTION OF EMBODIMENTS

Hereinafter, modes for implementing an electric motor according to the present invention will be described based on embodiments.

First Embodiment

An electric motor according to the first embodiment of the present invention will be described with reference to FIGS. 1 to 4.

Figure 1:
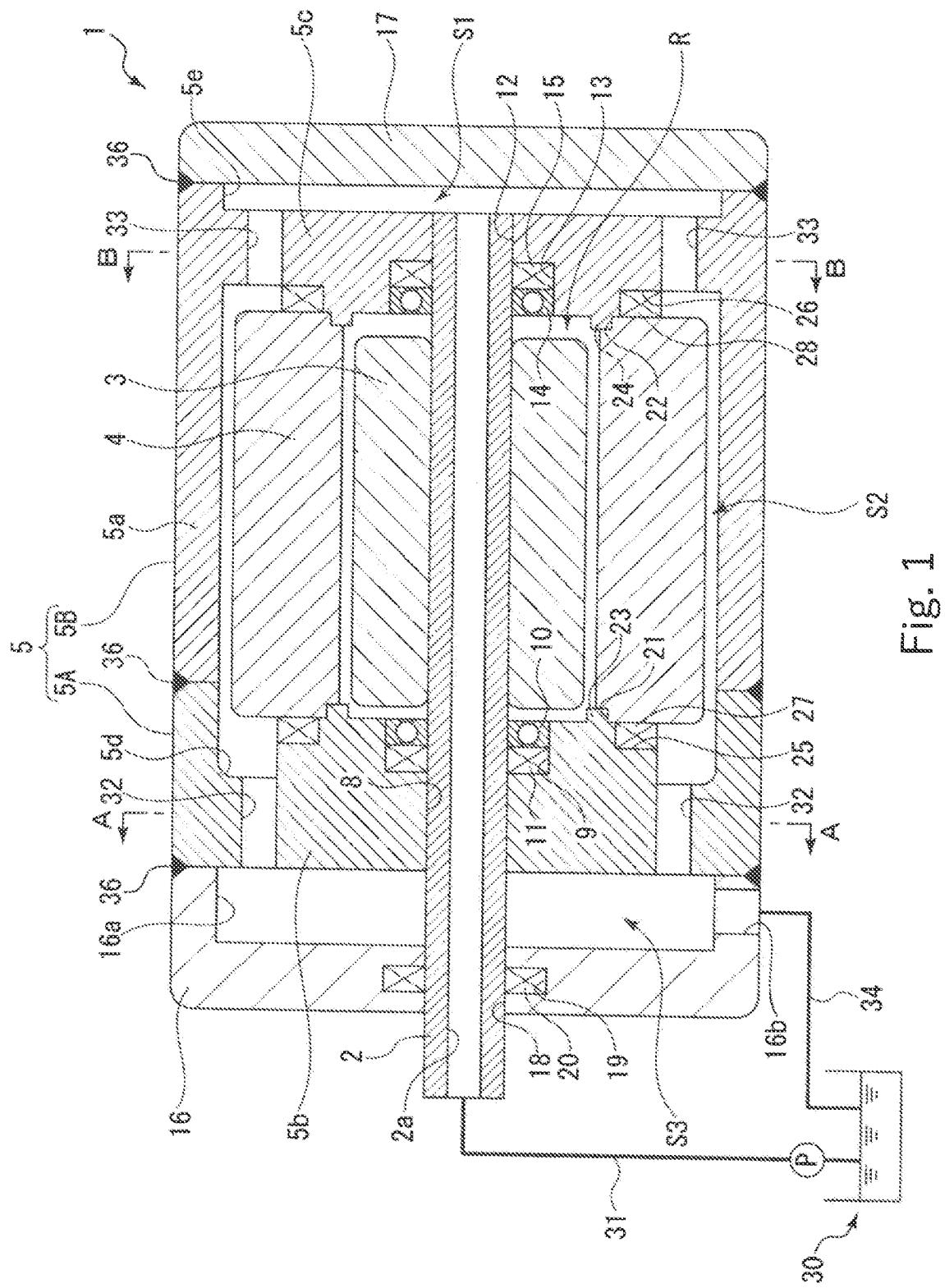
FIG. 1 is a sectional view showing an electric motor according to a first embodiment of the present invention.

As shown in FIG. 1, an electric motor 1 includes a rotation shaft 2, a rotor 3 fixed to the rotation shaft 2, the rotor to be rotated together with the rotation shaft 2, an annular stator 4 provided on the outer periphery side of the rotor 3 to be spaced from the rotor in the radial direction, and a case 5 housing the rotor 3 and the stator 4. The rotor 3 is an electromagnet formed by winding a coil, and the stator 4 is a permanent magnet. Magnetic force is generated by distributing electric power to the coil which forms the rotor 3 from a power source (not shown), so that the rotor 3 and the rotation shaft 2 fixed to the rotor 3 are rotated. The case 5 is made of metal such as iron, and the rotation shaft 2 is made of a non-magnetic body such as stainless steel.

The case 5 is divided into two bodies in the axial direction of the rotation shaft 2. These divided case bodies 5A, 5B are welded and fixed at a welded portion 36 on the outer periphery of the case 5 and brought into a sealed state.

The case 5 is formed by a peripheral wall portion 5a and support wall portions 5b, 5c. The peripheral wall portion 5a is formed into a substantially cylindrical shape and has an outer peripheral surface and an inner peripheral surface of the case 5. The support wall portions 5b, 5c are each formed into a substantially circular-plate shape and form both side walls of the case 5. A through hole 8 passing through the support wall portion 5b in the axial direction is formed at the radial center of the support wall portion 5b on a side of the divided case body 5A. In the support wall portion 5b on the side of the divided case body 5A, a step portion 9 which is recessed radially from the through hole 8 and opens toward a side of the support wall portion 5c of the opposite divided case body 5B is formed continuously in the circumferential direction of the through hole 8. A bearing 10 is attached to the step portion 9, and the rotation shaft 2 is axially supported by the case 5 via the bearing 10. A seal ring 11 which is an annular seal member is arranged at the back of the bearing 10 in the step portion 9 so as to seal a boundary portion between the rotation shaft 2 and the divided case body 5A.

A through hole 12 passing through the support wall portion 5c in the axial direction is formed at the radial center of the support wall portion 5c on the side of the divided case body 5B. In the support wall portion 5c on the side of the divided case body 5B, a step portion 13 which is recessed radially and opens toward the side of the support wall portion 5b of the opposite divided case body 5A is formed continuously in the circumferential direction of the through hole 12. A bearing 14 is attached to the step portion 13, and the rotation shaft 2 is axially supported by the case 5 via the bearing 14. A seal ring 15 which is an annular seal member is arranged at the back of the bearing 14 in the step portion 13 so as to seal a boundary portion between the rotation shaft 2 and the divided case body 5B.

A substantially cup shaped cap 16 and a substantially circular-plate shaped cap 17 are respectively welded and fixed to both axial end portions of the case 5 at welded portions 36 on the outer periphery and brought into a sealed state. The caps 16, 17 are made of metal such as iron. A through hole 18 passing through the cap 16 in the axial direction is formed at the radial center of the cap 16 on the side of the divided case body 5A, and the rotation shaft 2 is partially inserted into the through hole 18. An annular groove portion 19 opening radially inward is formed on an inner peripheral surface of the through hole 18. A seal ring 20 which is an annular seal member is fitted to the groove portion 19 so as to seal a boundary portion between the rotation shaft 2 and the cap 16.

The stator 4 is provided between the support wall portion 5b on the side of the divided case body 5A and the support wall portion 5c on the side of the divided case body 5B. Annular recessed portions 21, 22 are formed on surfaces of the stator 4 facing the support wall portion 5b and the support wall portion 5c on the inner diameter side of the stator. Annular projected portions 23, 24 formed in the support wall portion 5b and the support wall portion 5c, the projected portions projecting in the axial direction are respectively engaged with these recessed portions 21, 22. Thereby, axial and radial movements of the stator 4 are regulated.

Annular step portions 25, 26 are respectively formed in the support wall portion 5b on the side of the divided case body 5A and the support wall portion 5c on the side of the divided case body 5B on the outer diameter sides thereof. Seal rings 27, 28 which are annular seal members are respectively arranged in the step portions 25, 26. The divided case body 5A and the stator 4 are connected to each other in a sealed state, and the divided case body 5B and the stator 4 are connected to each other in a sealed state. The divided case body 5A, the stator 4, and the divided case body 5B defines a housing space R which is sealed and in which the rotor is housed so as to surround the rotor 3 and part of the rotation shaft 2.

The rotation shaft 2 includes a hollow portion 2a (serving as an inner flow passage) passing through the rotation shaft 2 in the axial direction and being open to both ends of the rotation shaft 2. A cooling-fluid tank 30 is installed in the exterior of the electric motor 1, and a cooling-fluid in the cooling-fluid tank 30 is fed into the hollow portion 2a through a suctioning passage 31 by a pump P.

A recessed portion 5d is formed on an inner peripheral surface of the peripheral wall portion 5a of the case 5 so as to be recessed in the outer diameter direction. An inner diameter of the bottom surface of the recessed portion 5d is formed to be greater than an outer diameter of the stator 4, so that a space S2 serving as an outer flow passage is formed between the recessed portion 5d of the case 5 and the stator 4.

A recessed portion 5e recessed in the axial direction is formed in an end portion of the case 5 on the side of the cap 17 in the axial direction. A space S1 serving as a communication flow passage is formed between the cap 17 and the recessed portion 5e formed in the support wall portion 5c of the case 5.

A recessed portion 16a recessed in the outward axial direction is formed on an inner surface of the cap 16 facing an axial end portion of the case 5. A space S3 serving as a discharge flow passage is defined by the recessed portion 16a of the cap 16 and the end portion of the case 5. A through hole 16b communicating with a discharge passage 34 is formed in the cap 16, so that the cooling-fluid in the space S3 can be returned to the cooling-fluid tank 30 via the discharge passage 34.

The hollow portion 2a of the rotation shaft 2 communicates with the space S1 formed between the cap 17 and the recessed portion 5e of the case 5.

Figure 2:
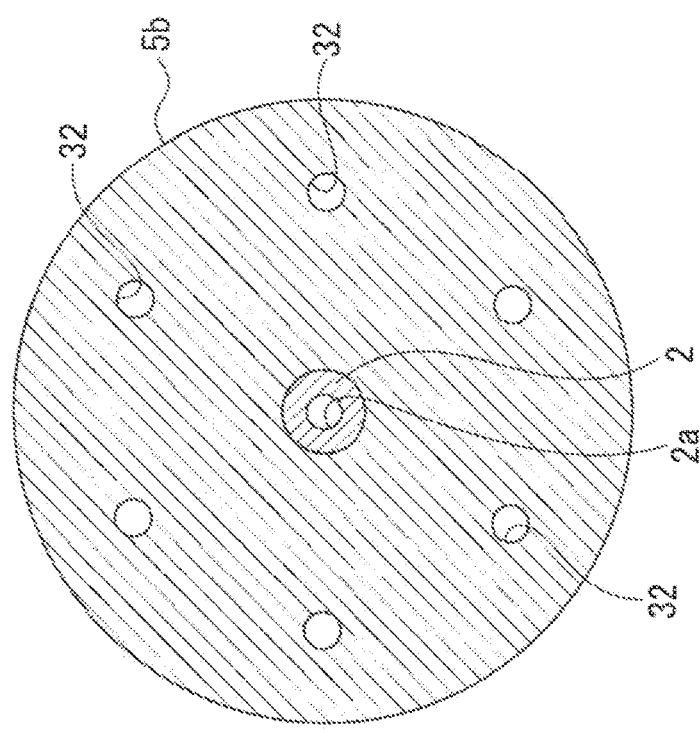
FIG. 2 is a sectional view taken along the line A-A of a case shown in FIG. 1.
Figure 3:
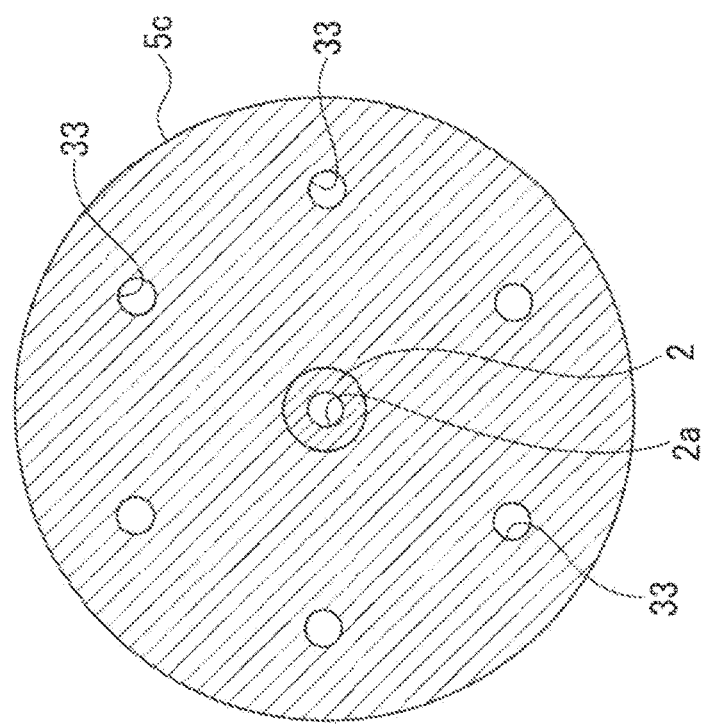
FIG. 3 is a sectional view taken along the line B-B of the case shown in FIG. 1.

As shown in FIG. 2, plural through holes 32 are formed in the support wall 5b so as to pass through the support wall 5b in the axial direction and are arranged in the circumferential direction of the support wall portion 5b of the case 5. As shown in FIG. 3, plural through holes 33 are similarly formed in the support wall 5c so as to pass through the support wall 5c in the axial direction and arranged in the circumferential direction of the support wall portion 5c of the case 5.

By way of the through holes 32 formed in the support wall portion 5b of the case 5, the space S3 formed between the recessed portion 16a of the cap 16 and the end portion of the case 5 communicates with the space S2 formed between the recessed portion 5d of the case 5 and the stator 4.

Similarly, by way of the through holes 33 formed in the support wall portion 5c of the case 5, the space S1 communicates with the space S2.

As described above, a cooling-fluid flow passage in the electric motor 1 is formed by the hollow portion 2a of the rotation shaft 2, the space S1 formed between the cap 17 and the recessed portion 5e of the case 5, the through holes 33, the space S2 formed between the cap 17 and the recessed portion 5e of the case 5, the through holes 32, the space S3 formed between the recessed portion 16a of the cap 16 and the end portion of the case 5, and the discharge passage 34.

Figure 4:
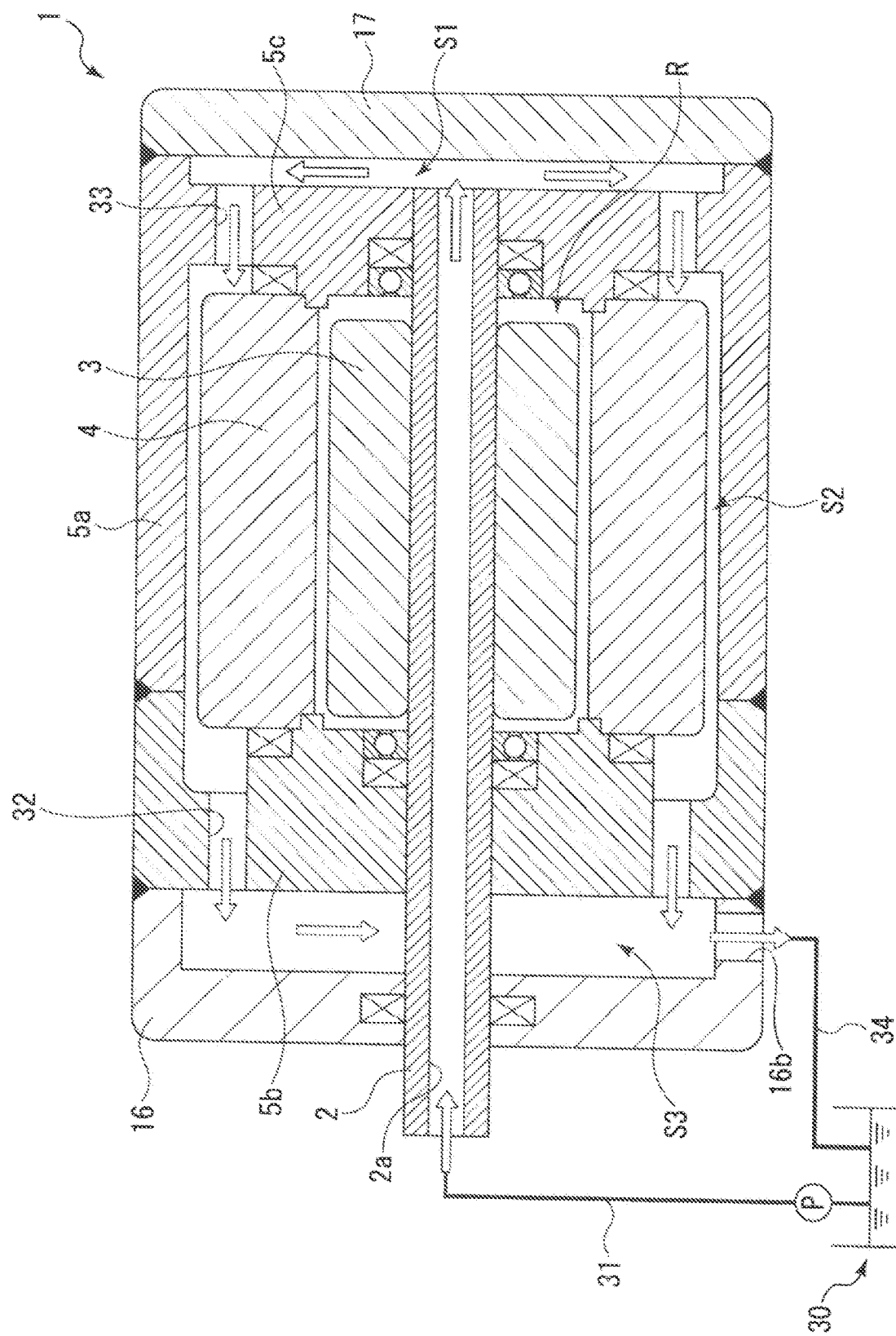
FIG. 4 is a sectional view of a stator, showing a flow of a cooling-fluid of the electric motor in the first embodiment.

Next, a route of the cooling-fluid fed into the electric motor 1 from the cooling-fluid tank 30 will be described by using FIGS. 1 and 4. Firstly, the cooling-fluid in the cooling-fluid tank 30 is fed into the hollow portion 2a of the rotation shaft 2 through the suctioning passage 31 by the pump P. The rotation shaft 2 is cooled by the cooling-fluid passing through the hollow portion 2a. In addition, the surface parts of the through holes 18, 8, 12 functioning as slide bearings supporting the rotation shaft 2, the seal rings 20, 11, 15, and the bearings 10, 14 are respectively cooled. In other words, the portions in which heat is possibly generated due to friction caused by rotation of the rotation shaft 2 can be effectively cooled.

The rotor 3 is also cooled via the rotation shaft 2. Thereby, the increase of the heat generated in the rotor 3 due to electric power distribution to the coil which forms the rotor 3 can be reduced, so that an efficiency decrease of the electric motor and breakage of the rotor 3 can be prevented.

The cooling-fluid fed into the hollow portion 2a is moved in the axial direction in the hollow portion 2a and moved to the space S1 formed between the cap 17 and the recessed portion 5e of the case 5. Next, the cooling-fluid is moved from the space S1 to the space S2 formed between the recessed portion 5d of the case 5 and the stator 4 through the through holes 33.

The cooling-fluid fed into the space S2 is moved in the axial direction and the circumferential direction in the space S2, and directly cools the stator 4 from the side of an outer peripheral surface. Thereby, the stator 4 heated by the generated heat of the rotor 3 can be cooled. In a case where the stator 4 is an electromagnet formed by a coil, a heat increase caused by the stator 4 itself can be reduced.

Next, the cooling-fluid in the space S2 is moved from the space S2 to the space S3 formed between the recessed portion 16a of the cap 16 and the end portion of the case 5 through the through holes 32. The cooling-fluid fed into the space S3 is returned to the cooling-fluid tank 30 through the through hole 16b formed in the cap 16 and the discharge passage 34. That is, the through holes 32, the space S3, and the through hole 16b serve as a discharge flow passage. In the space S3, the rotation shaft 2 is directly cooled by the cooling-fluid from the outer peripheral side thereof.

In such a way, the rotor 3 and the peripheral portion of the rotation shaft 2 are cooled by the cooling-fluid passing through the hollow portion 2a (referred to as an inner flow passage) formed in the rotation shaft 2, and the stator 4 is cooled by the cooling-fluid flowing through the space S2 (referred to as an outer flow passage) formed between the outer periphery of the stator 4 and the inner periphery of the case 5. Further, the communication between the hollow portion 2a and the space S2 is provided by the space S1 (referred to as a communication flow passage) formed between the cap 17 and the recessed portion 5e of the case 5, the space being isolated from the housing space R in which the rotor 3 is housed. Therefore, the cooling-fluid flow passage can be formed in a simplified manner, and the cooling-fluid does not influence rotation of the rotor 3.

By the support wall portion 5b and the support wall portion 5c of the case 5 which support the rotation shaft 2, the space S1 serving as the communication flow passage and the space S3 serving as the discharge flow passage can be easily formed in a state where the spaces S1 and S3 are isolated from the housing space R.

The seal rings 27, 28 are provided between the stator 4 and the support wall portions 5b and 5c. Thus, the cooling-fluid, contamination, etc. cannot easily come into the housing space R in which the rotor 3 is housed, so that an influence on the rotation of the rotor 3 can be reliably prevented.

The plural through holes 33 formed in the support wall portion 5c serve as part of the communication flow passage between the space S2 and the space S1. Therefore, the number of members defining the communication flow passage can be reduced. The plural through holes 33 are arranged in the circumferential direction. Thus, the cooling-fluid can be dividedly fed in the circumferential direction of the space S2, so that the outer periphery of the stator 4 can be cooled evenly.

The plural through holes 32 are arranged in the circumferential direction of the support wall portion 5b, and thus the cooling-fluid in the space S2 is circumferentially divided and fed into the space S3. Therefore, the cooling-fluid can be moved into the space 3 without stagnating in the space 2 and as a result the cooling can be performed efficiently.

Since the hollow portion 2a of the rotation shaft 2 is open to both the axial ends of the rotation shaft 2, the rotation shaft 2 has no wall portion against which the cooling-fluid impinges. For this reason, the rotation shaft 2 can be prevented from receiving an axial force and being damaged.

The cooling-fluid fed into the electric motor 1 from the cooling-fluid tank 30 flows to the hollow portion 2a of the rotation shaft 2 serving as the inner flow passage, the space S1 serving as the communication flow passage, and the space S2 serving as the outer flow passage in order of description. Thereby, since the sliding contact portions between the rotor 3 and the rotation shaft 2 where a heat generation amount is great can be cooled by the cooling-fluid having relatively low temperature, the entire cooling efficiency is excellent.

Second Embodiment

Figure 5:
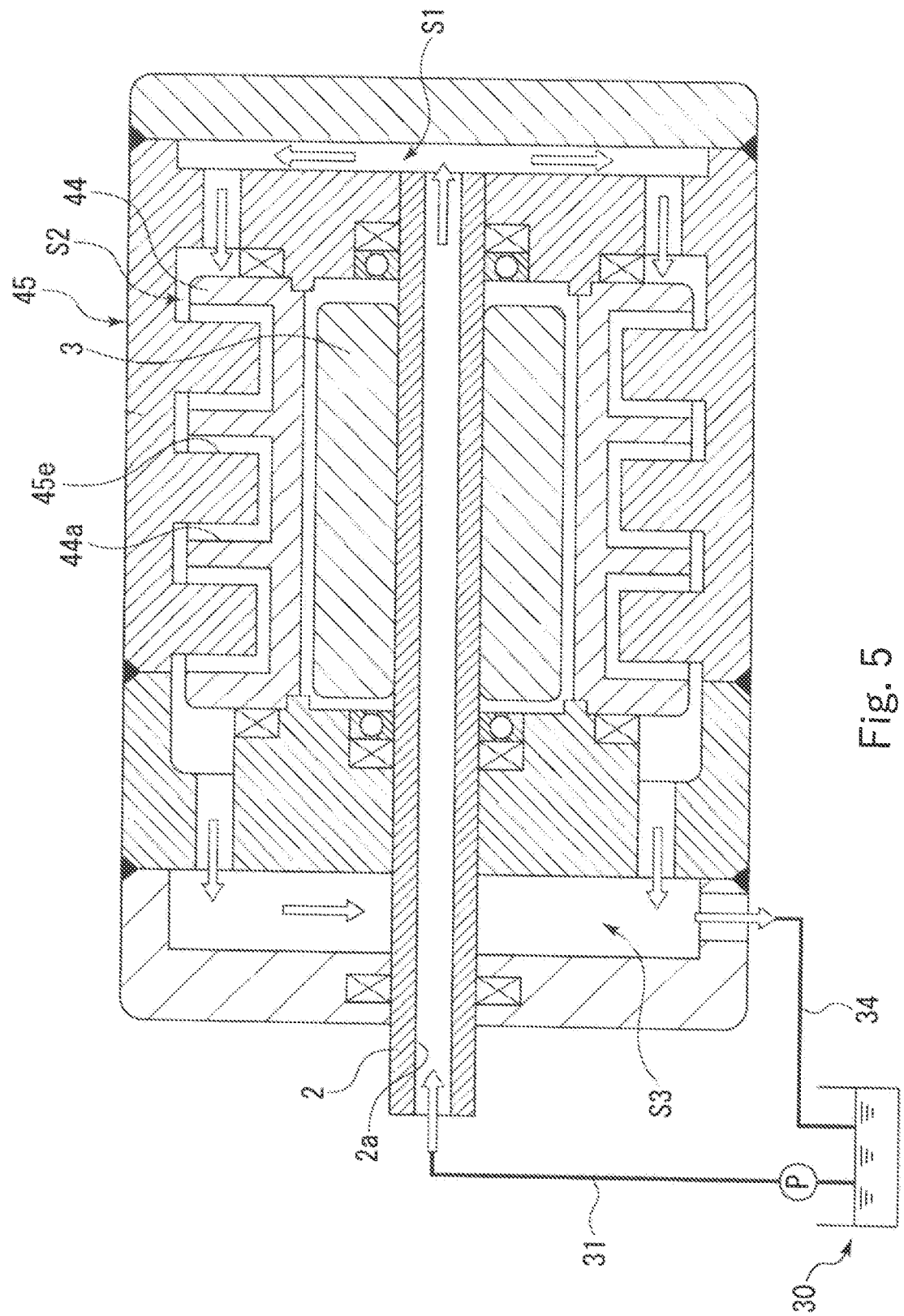
FIG. 5 is a sectional view showing an electric motor according to a second embodiment of the present invention.

Next, an electric motor according to a second embodiment of the present invention will be described with reference to FIG. 5. Description of the same and overlapping configurations with the above first embodiment will be omitted.

Plural recessed portions 44a recessed toward the inner diameter side are formed on the outer periphery of a stator 44 so as to be arranged in the axial direction, and plural projected portions 45e projecting toward the inner diameter side to be loosely fitted into the recessed portions 44a are formed on the inner periphery of a case 45 so as to be arranged in the axial direction. Thereby, since the cooling-fluid fed into the space S2 comes into the inner diameter side of the stator 44 due to the recessed portions 44a formed in the stator 44, the stator 44 can be promptly cooled. The cooling-fluid fed into the space S2 can be reliably guided into the recessed portions 44a by the projected portions 45e formed in the case 45. Further, a cross-sectional area of the flow passage becomes substantially constant in a flow direction due to the recessed portion and the projected portion. Thus, the cooling-fluid easily flows to the inner diameter side of the stator 44.

Third Embodiment

Figure 6:
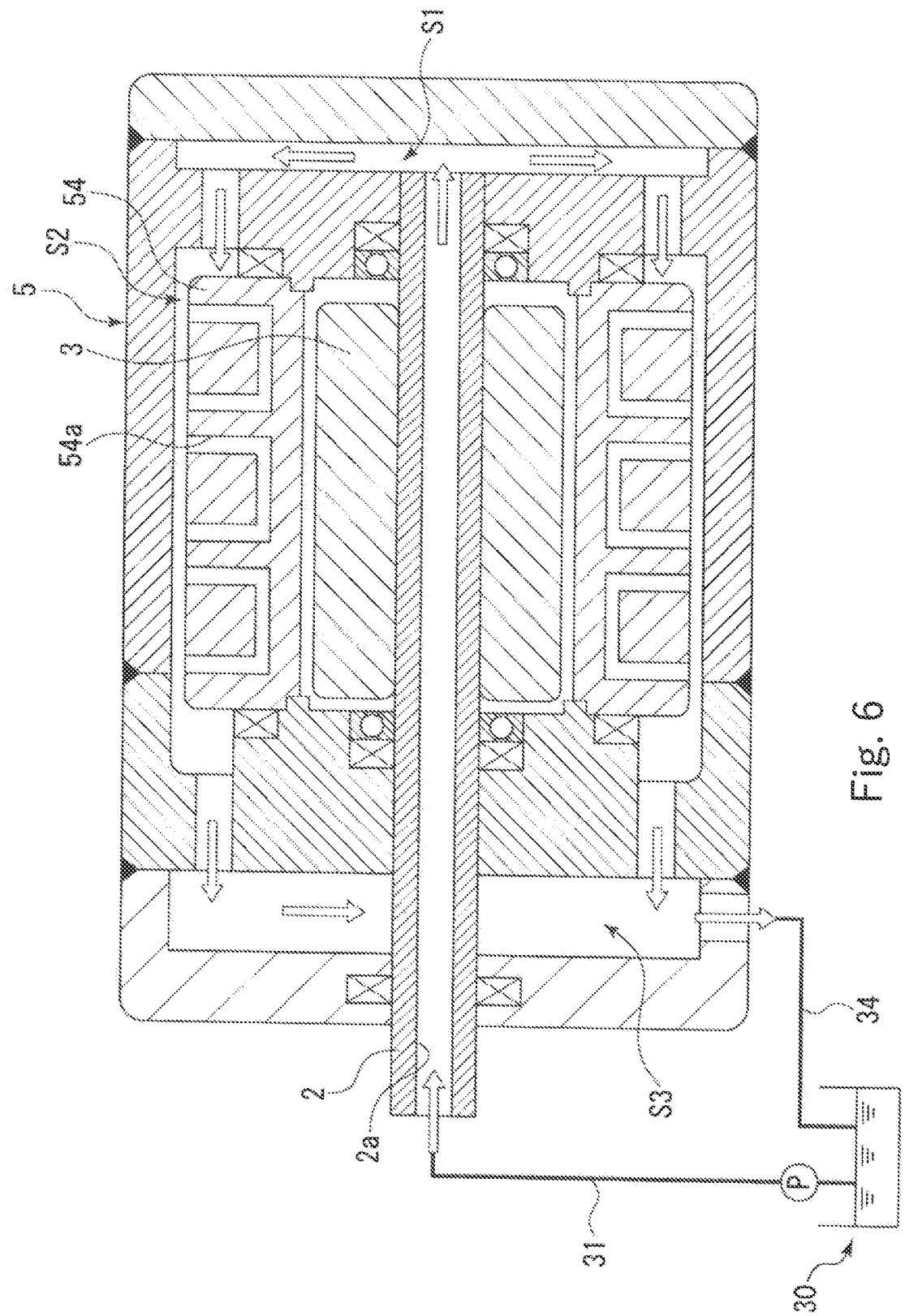
FIG. 6 is a sectional view showing an electric motor according to a third embodiment of the present invention.

Next, an electric motor according to a third embodiment of the present invention will be described with reference to FIG. 6. Description of the same and overlapping configurations with the above embodiment will be omitted.

Plural guiding passages 54*a* extending toward the inner diameter side and turning down on the inner diameter side of a stator 54 toward the outer diameter side, e.g., extending radially inward, then axially and then radially outward, are formed on the outer periphery of the stator 54 so as to be arranged in the axial direction. Thereby, since the cooling-fluid fed into the space S2 comes into the inner diameter side of the stator 54 due to the guiding passages 54*a* formed in the stator 54, the stator 54 can be promptly cooled.

The embodiments of the present invention are described above with the drawings. However, actual configurations are not limited to these embodiments but changes and additions within the range not departing from the scope of the present invention are also included in the present invention.

In aforesaid embodiments, the communication flow passage is formed by the space S1 defined between the cap 17 and the recessed portion 5*e* which is formed in the support wall portion 5*c* of the case 5, and the through holes 32. However, the present invention is not limited to this configuration but, for example, the cap 17 may be formed into a substantially cup shape provided with a recessed portion, and the recessed portion of the support wall portion 5*c* of the case 5 may be eliminated. On the other hand, the cap 17 may be eliminated, and the communication flow passage may be formed by a pipe, etc. providing communication between the hollow portion 2*a* of the rotation shaft 2 and the space S2 which is formed between the recessed portion 5*d* of the case 5 and the stator 4 in a state where the hollow portion and the space are isolated from the housing space R.

The discharge flow passage of the above-mentioned embodiments is formed by the space S3 defined between the cap 16 and the support wall portion 5*b* of the case 5, the through holes 32, and the through hole 16*b*. However, the present invention is not limited to this configuration, the cap 16 may be eliminated, and the discharge flow passage may be formed by a pipe, etc. providing communication between the discharge passage 34 and the space S2 which is defined between the recessed portion 5*d* of the case 5 and the stator 4 in a state where the space and the discharge passage are isolated from the housing space R.

The space S3 serving as the discharge flow passage is not limited to the configuration in which the cooling-fluid is brought into direct contact with the rotation shaft 2. However, for example, an annular partition may be disposed on the outer diameter side of the rotation shaft 2 and the cooling-fluid in the space S3 may be not brought into direct contact with the rotation shaft 2, so that the rotation of the rotation shaft 2 are not easily influenced.

The case 5 is not limited to the divided structure, and regarding the divided structure, the case may be divided in the up and down direction.

By providing the recessed portion 5*d* on the inner periphery of the case 5, the space S2 is formed between the inner periphery of the case 5 and the stator 4 without increasing size of the electric motor 1. However, the present invention is not limited to this configuration but the space S2 may be formed not by providing any recessed portion on the inner periphery of the case 5 but by a difference between an inner diameter of the case 5 and the outer diameter of the stator 4.

In the above embodiment, the space S1 is formed into a substantially circular shape having predetermined depth between the cap 17 and the recessed portion 5*e* which is formed in the support wall portion 5*c* of the case 5. However, the present invention is not limited to this configuration but, for example, plural straight grooves communicating with the hollow portion 2*a* of the rotation shaft 2 and extending in a radial manner may be formed in the recessed portion 5*e*, and the space may be formed between these straight grooves and the cap 17.

In the aforesaid embodiments, the electric motor is used and described as the modes of the invention in which the peripheral portion of the rotation shaft and the rotor and the stator are cooled without providing resistance against the rotation of the rotor. However, the present invention is not limited to the electric motor but, for example, even when the above cooling-fluid flow passage is applied to a power generator, the same operations and the same effects can be obtained.

The case 5 and the caps 16, 17 may be made of a material other than metal.

REFERENCE SIGNS LIST

1 Electric motor
2 Rotation shaft
2*a* Hollow portion (inner flow passage)
3 Rotor
4 Stator
5 Case
5*a* Peripheral wall portion
5*b* Support wall portion (Second support wall)
5*c* Support wall portion (First support wall)
5A Divided case body
5B Divided case body
8 Through hole
11 Seal ring (seal member)
16 Cap
16*b* Through hole (discharge flow passage)
17 Cap
30 Cooling-fluid tank
31 Suctioning passage
32 Through hole (discharge flow passage)
33 Through hole (communication flow passage)
34 Discharge passage
44 Stator
44*a* Recessed portion
45 Case
45*e* Projected portion
54 Stator
54*a* Guiding passage
P Pump
R Housing space
S1 Space (communication flow passage)
S2 Space (outer flow passage)
S3 Space (discharge flow passage)

The invention claimed is:

1. An electric motor comprising:
a rotation shaft formed in a hollow shape;
a rotor attached to the rotation shaft;
a stator provided on an outer periphery side of the rotor; and
a case having the rotor and the stator housed therein,
the electric motor being capable of cooling itself by a cooling-fluid flowing in a cooling-fluid flow passage, wherein
the cooling-fluid flow passage includes:
an inner flow passage formed inside the rotation shaft and communicating with outside of the case;
an outer flow passage formed between an outer periphery of the stator and an inner periphery of the case;
a first communication flow passage formed on a first end side of the rotor and isolated from a housing space of the case in which the rotor is housed, the first communication flow passage providing communication between the inner flow passage and the outer flow passage; and
a second communication flow passage formed on a second end side of the rotor and isolated from the housing space of the case, the second communication flow passage being partially defined by an outer peripheral surface of the rotation shaft and communicating with the outer flow passage and the outside of the case.

2. The electric motor according to claim 1, wherein
the rotation shaft passes through a first support wall placed on the first end side of the rotor, and is axially supported by the first support wall.

3. The electric motor according to claim 2, wherein
the first communication flow passage is formed between the first support wall and a first cap placed on the first end side and attached to the first support wall.

4. The electric motor according to claim 3, wherein
a first seal member is arranged between the stator and the first support wall.

5. The electric motor according to claim 4, wherein
first plural through holes, each serving as part of the first communication passage and passing through the first support wall in the axial direction are formed in the first support wall so as to be arranged in the circumferential direction of the first support wall.

6. The electric motor according to claim 5, wherein
the rotation shaft passes through a second support wall placed on a second end side of the rotor, and is axially supported by the second support wall, and
a second seal member is provided between the stator and the second support wall.

7. The electric motor according to claim 6, wherein
the second communication flow passage is defined by the second support wall and a second cap attached to the second support wall as well as the outer peripheral surface of the rotation shaft.

8. The electric motor according to claim 7, wherein
second plural through holes are formed in the second support wall so as to pass through the second support wall in the axial direction and communicates with the outer flow passage.

9. The electric motor according to claim 5, wherein
the inner flow passage is open at both axial ends of the rotation shaft.

10. The electric motor according to claim 5, wherein
the cooling-fluid flows through the inner flow passage, the first communication flow passage, and the outer flow passage in order of description.

11. The electric motor according to claim 5, wherein
a recessed portion recessed toward an inner diameter side of the stator is formed on the outer periphery of the stator.

12. The electric motor according to claim 11, wherein
a projected portion loosely fitted into the recessed portion of the stator is formed on the inner periphery of the case.

13. The electric motor according to claim 3, wherein
first plural through holes, each serving as part of the first communication passage and passing through the first support wall in the axial direction are formed in the first support wall so as to be arranged in the circumferential direction of the first support wall.

14. The electric motor according to claim 1, wherein
the rotation shaft passes through a second support wall placed on the second end side of the rotor, and is axially supported by the second support wall, and
a second seal member is provided between the stator and the second support wall.

15. The electric motor according to claim 14, wherein
the second communication flow passage is defined by the second support wall and a second cap attached to the second support wall as well as the outer peripheral surface of the rotation shaft.

16. The electric motor according to claim 15, wherein
second plural through holes are formed in the second support wall so as to pass through the second support wall in the axial direction and communicates with the outer flow passage.

17. The electric motor according to claim 1, wherein
the inner flow passage is open at both axial ends of the rotation shaft.

18. The electric motor according to claim 1, wherein
the cooling-fluid flows through the inner flow passage, the first communication flow passage, and the outer flow passage in order of description.

19. The electric motor according to claim 1, wherein
a recessed portion recessed toward an inner diameter side of the stator is formed on the outer periphery of the stator.

20. The electric motor according to claim 19, wherein
a projected portion loosely fitted into the recessed portion of the stator is formed on the inner periphery of the case.

* * * * *